US010712266B2

(12) United States Patent
Ohno

(10) Patent No.: US 10,712,266 B2
(45) Date of Patent: Jul. 14, 2020

(54) OPTICAL TEST APPARATUS, SEMICONDUCTOR DEVICE, AND OPTICAL TEST METHOD

(71) Applicant: KABUSHIKI KAISHA TOSHIBA, Tokyo (JP)

(72) Inventor: Hiroshi Ohno, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 56 days.

(21) Appl. No.: 16/111,276

(22) Filed: Aug. 24, 2018

(65) Prior Publication Data

US 2019/0285544 A1    Sep. 19, 2019

(30) Foreign Application Priority Data

Mar. 19, 2018 (JP) ................... 2018-051642

(51) Int. Cl.
*G01N 21/63* (2006.01)
*G01N 21/47* (2006.01)

(52) U.S. Cl.
CPC ....... *G01N 21/636* (2013.01); *G01N 21/4738* (2013.01)

(58) Field of Classification Search
CPC ....... G01N 2021/1706; G01N 21/1702; G01N 29/2418
See application file for complete search history.

(56) References Cited

U.S. PATENT DOCUMENTS

| 5,228,776 A * | 7/1993 | Smith ............... G01N 21/1717 374/5 |
| 5,982,482 A * | 11/1999 | Nelson .............. G01N 29/2418 356/237.1 |
| 6,684,704 B1 * | 2/2004 | Obeng ................ B24B 37/005 451/21 |
| 2001/0028460 A1* | 10/2001 | Maris ................. G01N 21/1702 356/432 |
| 2007/0157730 A1* | 7/2007 | Ochiai .................. F22B 37/003 73/627 |

(Continued)

FOREIGN PATENT DOCUMENTS

| JP | 2007-17297 A | 1/2007 |
| JP | 2008-134186 A | 6/2008 |
| JP | 2011-120795 A | 6/2011 |

*Primary Examiner* — Shawn Decenzo
(74) *Attorney, Agent, or Firm* — Finnegan, Henderson, Farabow, Garrett & Dunner, L.L.P.

(57) ABSTRACT

According to one embodiment, an optical test apparatus includes a pump beam generating unit, a probe beam generating unit, and a photodetector. The pump beam generating unit is configured to irradiate a first surface region of a test object with a pump beam having a first wavelength which is transmitted through a first region including the first surface region and a first inner region adjacent to the first surface region and absorbed by an absorber arranged in the first inner region. The probe beam generating unit is configured to irradiate a second surface region outside the first surface region with a probe beam having a second wavelength which is reflected by the second surface region. The photodetector is configured to receive the probe beam reflected by the second surface region.

14 Claims, 4 Drawing Sheets

(56) References Cited

U.S. PATENT DOCUMENTS

| | | | | |
|---|---|---|---|---|
| 2008/0123079 A1* | 5/2008 | Numata | ............... | G01L 1/241 |
| | | | | 356/35.5 |
| 2013/0031982 A1* | 2/2013 | Sato | ............... | A61B 5/0095 |
| | | | | 73/655 |
| 2015/0371956 A1* | 12/2015 | Agarwal | ............... | H01L 23/562 |
| | | | | 438/430 |
| 2016/0043008 A1* | 2/2016 | Murray | ............... | G01N 29/2418 |
| | | | | 438/5 |
| 2016/0187302 A1* | 6/2016 | Satoh | ............... | G01N 29/09 |
| | | | | 73/574 |
| 2016/0189953 A1* | 6/2016 | Park | ............... | H01L 21/02359 |
| | | | | 438/781 |

* cited by examiner

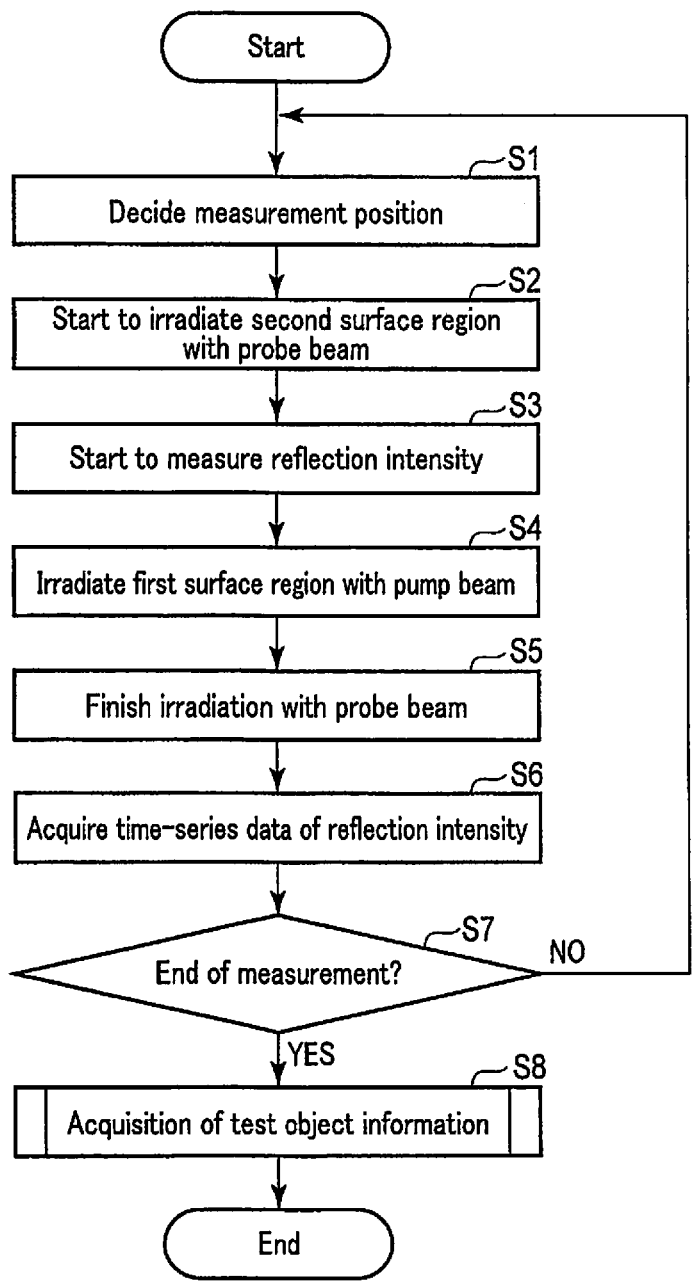
F I G. 2

OPTICAL TEST APPARATUS, SEMICONDUCTOR DEVICE, AND OPTICAL TEST METHOD

CROSS-REFERENCE TO RELATED APPLICATION

This application is based upon and claims the benefit of priority from Japanese Patent Application No. 2018-51642, filed Mar. 19, 2018, the entire contents of which are incorporated herein by reference.

FIELD

Embodiments described herein relate generally to an optical test apparatus, a semiconductor device, and an optical test method.

BACKGROUND

There are demands for techniques of conducting non-destructive internal tests of test objects. For example, there is available a technique of testing the inner structure of a semiconductor by a non-destructive internal test using a laser ultrasonic device. The laser ultrasonic device irradiates the surface of a test object with a laser beam to make the object surface absorb the light, thereby making the object internally generate elastic waves. The elastic waves generated inside the object propagate inside the object. The laser ultrasonic device internally tests a test object by acquiring a signal concerning elastic waves propagating in the object.

BRIEF DESCRIPTION OF THE DRAWINGS

FIG. 2 is a flowchart showing an example of measurement processing executed by the optical test apparatus according to the first embodiment;

DETAILED DESCRIPTION

When an object surface is made to absorb light and generate elastic waves, the elastic waves propagate in the depth direction inside the object. In addition, a region where an inner structure can be tested by using elastic waves is a limited region through which elastic waves pass. This limits a region where an inner structure can be tested by using elastic waves.

According to one embodiment, an optical test apparatus includes a pump beam generating unit, a probe beam generating unit, and a photodetector. The pump beam generating unit is configured to irradiate a first surface region of a test object with a pump beam having a first wavelength which is transmitted through a first region including the first surface region and a first inner region adjacent to the first surface region and absorbed by an absorber arranged in the first inner region. The probe beam generating unit is configured to irradiate a second surface region outside the first surface region with a probe beam having a second wavelength which is reflected by the second surface region. The photodetector is configured to receive the probe beam reflected by the second surface region.

Various Embodiments will be described hereinafter with reference to the accompanying drawings. Each drawing is schematic or conceptual. Accordingly, the relationship between the thickness and the width of each part and the size ratio between each part are not necessarily the same as actual ones in each drawing. In addition, even when the same portions are shown, the portions are sometimes shown in different dimensions and ratios depending on the drawings. Note that in the description of each embodiment and the respective drawings, the same reference signs denote the same components described with reference to the drawings already referred to. A detailed description of such components will be omitted as appropriate. Note that in the description of each embodiment, although electromagnetic waves are sometimes referred to as light, the expression "light" is not intended to indicate only visible light.

First Embodiment

Figure 1:
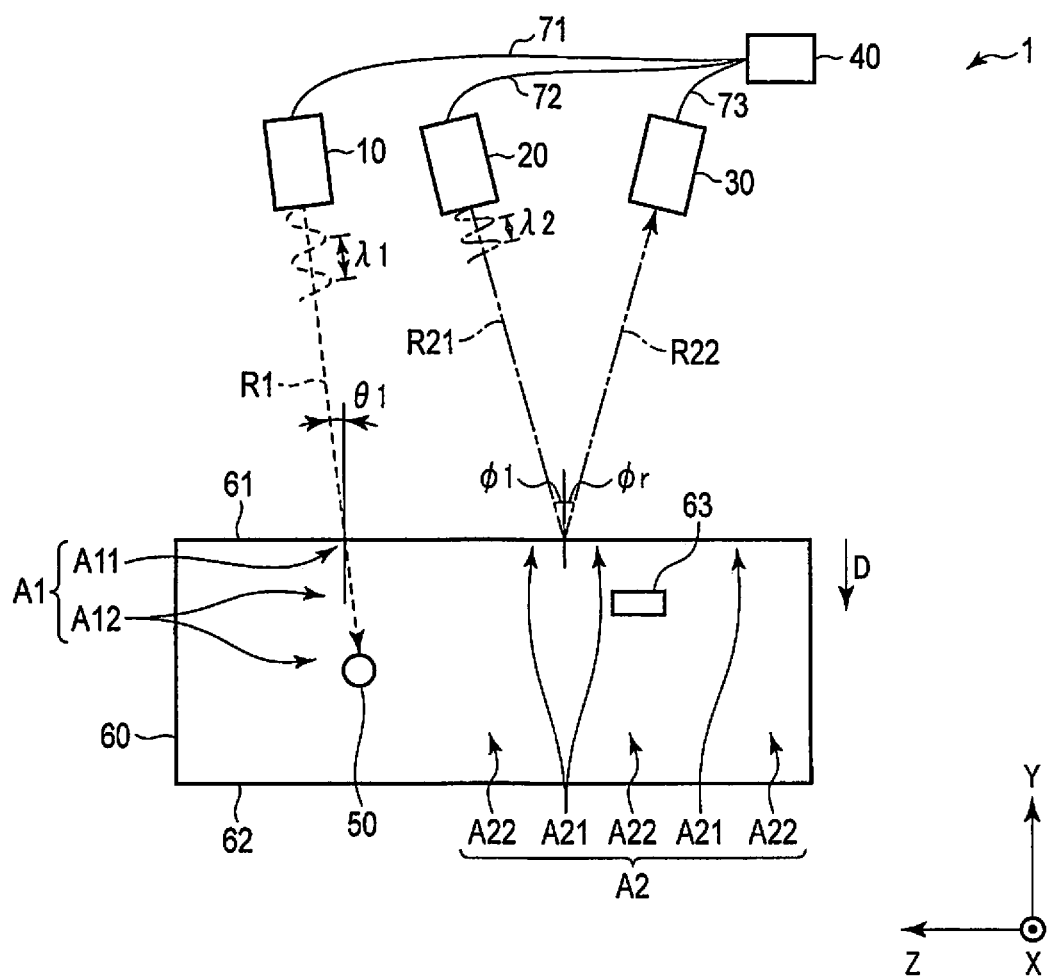
FIG. 1 is a schematic view showing an example of the arrangement of an optical test apparatus according to the first embodiment.

The arrangement of an optical test apparatus 1 according to this embodiment will be described first in detail below with reference to the accompanying drawings. FIG. 1 is a schematic view showing an example of the arrangement of the optical test apparatus 1 according to the embodiment. The optical test apparatus 1 is an optical measurement apparatus that contactlessly or non-destructively measures the inner structure of a test object 60 as a test target by using an optical technique.

FIG. 1 further shows an example of a Y-Z section of the test object 60. For example, as shown in FIG. 1, a direction from an obverse object surface 61 to a reverse object surface 62 of the test object 60 is defined as a depth direction D. Assume that the depth direction D is the −Y direction. The test object 60 is a semiconductor device such as a semiconductor wafer. A solid sample used as the test object 60 is, for example, amorphous silicon. As shown in, for example, FIG. 1, the test object 60 includes a first region A1 and a second region A2. The first region A1 and the second region A2 are different regions.

The first region A1 is a region including a first surface region A11 and a first inner region A12. The first surface region A11 is a region inside the obverse object surface 61. The first surface region A11 is a region irradiated with a pump beam R1. The first inner region A12 is a region inside the test object 60. The first inner region A12 is a region adjacent to the first surface region A11. An absorber 50 is arranged in the first inner region A12. The first region A1 is a region that transmits the pump beam R1 emitted from a pump beam generating unit 10 (to be described later).

The second region A2 includes a second surface region A21 and a second inner region A22. The second surface region A21 is a region inside the obverse object surface 61. The second surface region A21 is a region outside the first surface region A11. The second surface region A21 is a region irradiated with a probe beam R21. The second surface region A21 is a region that reflects the probe beam R21 emitted from a probe beam generating unit 20 (to be described later). The second inner region A22 is a region inside the test object 60. The second inner region A22 is a region outside the first inner region A12. The second inner region A22 is a region adjacent to the first inner region A12 and the second surface region A21.

The absorber 50 is arranged in the first inner region A12 of the test object 60. The absorber 50 is a substance that absorbs the light energy of the pump beam R1. A substance used as the absorber 50 is, for example, tungsten. The absorber 50 rapidly thermally expands upon absorbing the light energy of the pump beam R1. The thermal expansion of the absorber 50 generates elastic waves isotropically propagate in the test object 60. That is, the absorber 50 is a wave source of elastic waves radially propagate in the first inner region A12 and the second inner region A22. Accordingly, the first region A1 is only required to transmit the pump beam R1 to such a degree as to allow the absorber 50 to generate elastic waves. In general, the spot diameter of a laser beam has a theoretical limitation due to the diffraction limitation of light. An elastic wave that can be generated by a conventional scheme of irradiating the surface of an object with a pump beam has a size equal to or more than the spot diameter. Such an object usually generates elastic waves having sizes larger than the spot diameter because of thermal diffusion. Under such a situation, an elastic wave propagates along a structure smaller than the size of the wave almost without being influenced. This makes it difficult to detect a structure smaller than the spot diameter size of a laser beam. In this case, the maximum size of the absorber 50 according to this embodiment is smaller than, for example, the beam diameter of the pump beam R1. The absorber 50 may have any shape. The shape of the absorber 50 is, for example, spherical. The diameter of the absorber 50 is, for example, 100 nm. The beam diameter is, for example, the diameter of the pump beam R1 on a plane perpendicular to the optical axis. The maximum size is the maximum value of the length of one side of a rectangular parallelepiped which encloses the absorber 50 and to which the absorber 50 is inscribed. That is, the absorber 50 according to this embodiment generates an elastic wave that interferes with an inner structure 63 smaller than the spot diameter of a laser beam or beam diameter.

This embodiment will exemplify a case in which the inner structure 63 exists in the test object 60, as shown in FIG. 1. In this case, the inner structure 63 includes a space, interface, defect, or impurity existing inside the test object 60. The inner structure 63 causes a refractive index distribution inside the test object 60. The optical test apparatus 1 according to the embodiment acquires information concerning the inner structure 63 as test object information. As shown in FIG. 1, the optical test apparatus 1 includes the pump beam generating unit 10, the probe beam generating unit 20, and a photodetector 30.

The pump beam generating unit 10 includes a first light source and a first optical system. A light beam emitted from the first light source irradiates, in the form of a spot, an irradiation plane via the first optical system. The irradiation plane of the pump beam R1 is, for example, the first surface region A11. The first light source is, for example, a YAG laser. The first light source is, for example, a short-pulse laser. A short-pulse laser beam is a pulse-like laser beam having a very short pulse width. The pulse width is a time width relative to a time-series change in the intensity of a laser beam. Assume that the pulse width is, for example, a picosecond or less, and is, for example, several 100 fs (femtosecond). The first optical system includes, for example, at least one lens. A light beam emitted from the pump beam generating unit 10 will be written as the pump beam R1.

The broken line in FIG. 1 represents an example of the light beam path of the pump beam R1. As shown in FIG. 1, the pump beam generating unit 10 emits the pump beam R1 toward the first region A1 of the test object 60. A first wavelength $\lambda 1$ that is the wavelength of the pump beam R1 is, for example, 1,024 nm. Although described in detail later, the first wavelength $\lambda 1$ is selected such that the pump beam R1 is transmitted through the first region A1 of the test object 60 and is absorbed by the absorber 50 arranged inside the test object 60. The beam diameter of the pump beam R1 is, for example, 10 μm. As described above, the diameter of the absorber 50 is, for example, 100 nm. That is, the beam diameter of the pump beam R1 is larger than the absorber 50.

The probe beam generating unit 20 includes a second light source and a second optical system. A light beam emitted from the second light source irradiates, in the form of a spot, an irradiation plane via the second optical system. The irradiation plane of the probe beam R21 is, for example, the second surface region A21. The second light source is, for example, a YAG laser. The second optical system includes, for example, at least one lens and an actuator. The actuator operates based on a control signal output from a controlling circuit 40. The actuator drives the lens of the second optical system to change the irradiation position of the probe beam generating unit 20.

The one-dot dashed line in FIG. 1 indicates an example of the light beam path of the probe beam R21. As shown in FIG. 1, the probe beam generating unit 20 emits the probe beam R21 toward the second surface region A21 of the test object 60. A second wavelength $\lambda 2$ as the wavelength of the probe beam R21 is, for example, 532 nm. Although described in detail later, the second wavelength $\lambda 2$ is selected such that the light is reflected by the second surface region A21 of the test object 60.

The photodetector 30 includes a photodetection element and a third optical system. The photodetection element receives a reflected beam R22 via the third optical system. In this case, the reflected beam R22 is the probe beam R21 reflected by the second surface region A21. The photodetection element is configured to measure the intensity of the received reflected beam R22. The photodetection element is an optical sensor such as a CCD (Charge Coupled Device) or CMOS (Complementary Metal Oxide Semiconductor). The photodetector 30 outputs the measured intensity of the reflected beam R22 as a photodetection signal. The intensity of the reflected beam R22 can also be expressed as the reflection intensity of the probe beam R21.

The optical test apparatus 1 according to this embodiment further includes a controlling circuit 40. The controlling circuit 40 is configured to control the operation of each unit of the optical test apparatus 1. The controlling circuit 40 is an integrated circuit such as a CPU (Central Processing Unit) or ASIC (Application Specific Integrated Circuit). The controlling circuit 40 has functions as an arithmetic unit and a measurement controlling unit.

The arithmetic unit processes a photodetection signal output from the photodetector 30. The controlling circuit 40 acquires time-series data concerning the reflection intensity of the probe beam R21 based on the photodetection signal. The time-series data is the time series of the reflection intensity of the probe beam R21 and indicates an aspect of a time-series change. Time-series data can also be expressed as a time-series change. The time-series data of a reflection intensity is acquired for each measurement position. The arithmetic unit acquires test object information based on time-series data. The test object information includes information concerning the presence/absence, position, or shape of the inner structure 63. The test object information is acquired concerning, for example, the second inner region A22.

The measurement controlling unit decides a measurement range in the second surface region A21. The measurement range is a region where a reflection intensity is measured. The measurement controlling unit decides a measurement position in the measurement range. The measurement position is a position in the second surface region A21 which is irradiated with the probe beam R21. The measurement position is decided in accordance with, for example, a user input. The measurement position is decided in accordance with a program recorded in a recording circuit or the like in advance. The measurement controlling unit determines whether the measurement of a reflection intensity in the measurement range is completed.

Although not shown, the optical test apparatus 1 according to this embodiment further includes a power supply device and a recording circuit. The power supply device is configured to supply power to each unit of the optical test apparatus 1. The recording circuit is configured to record, for example, the time-series data of the reflection intensity and test object information acquired by the controlling circuit 40. In addition, processing programs and various types of parameters used by the optical test apparatus 1 are recorded in the recording circuit. Each processing associated with an operation of the optical test apparatus 1 is executed by, for example, each program recorded in the recording circuit. Each program may be recorded in advance inside the optical test apparatus 1 and may be read from an external recording medium in the optical test apparatus 1. In addition, the recording circuit temporarily records an output value from the photodetector 30 and data under processing in the controlling circuit 40. The recording circuit may be a volatile or nonvolatile memory. Note that part of the recording circuit may be provided inside the photodetector 30 or the controlling circuit 40. In addition, the recording circuit may be provided outside the optical test apparatus 1. In this case, the optical test apparatus 1 can be expressed as an apparatus that outputs a photodetection signal able to acquire test object information or the time-series data of a reflection intensity.

The pump beam generating unit 10, the probe beam generating unit 20, or the photodetector 30 and the controlling circuit 40 are respectively connected via a first cable 71, a second cable 72, and a third cable 73 so as to be able to transmit/receive control signals and the like to/from each other. In addition, the photodetector 30 and the controlling circuit 40 are connected to each other so as to be able transmit data such as photodetection signals and the like. Note that these connections may be made wiredly or wirelessly. In addition, data transmit may be performed via a recording medium outside the optical test apparatus 1, such as a Flash memory.

The operation of the optical test apparatus 1 according to this embodiment will be described next in detail with reference to the accompanying drawings.

Figure 3:
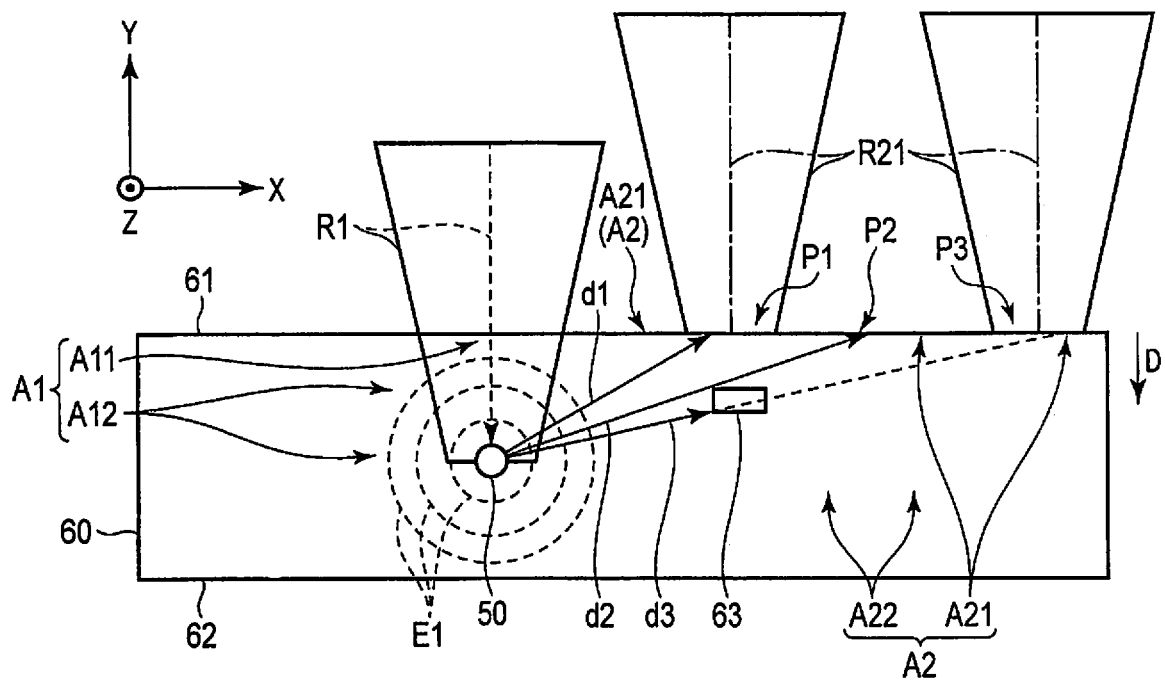
FIG. 3 is a view for explaining an example of the operation of the optical test apparatus according to the first embodiment.

FIG. 2 is a flowchart showing an example of measurement processing executed by the optical test apparatus 1 according to this embodiment. FIG. 3 is a view for explaining an example of the operation of the optical test apparatus 1 according to the embodiment. FIG. 3 shows an example of an X-Y section of the test object 60 and an example of each of the light beam paths of the pump beam R1, the probe beam R21, and the reflected beam R22.

The following will exemplify a case in which the inner structure 63 exists in the test object 60, as shown in FIG. 3. In the state shown in FIG. 3, the inner structure 63 exists on the +X side of the absorber 50. Assume that the inner structure 63 has a refractive index different from that of the remaining region inside the test object 60. That is, an interface exhibiting a change in refractive index exists inside the inner structure 63 or between the inner structure 63 and the remaining region inside the test object 60.

In step S1, the controlling circuit 40 decides a measurement position in accordance with the irradiation range of the probe beam R21. A measurement position is set in the second surface region A21 irradiated with the probe beam R21. FIG. 3 shows, as measurement positions, for example, a first measurement position P1, a second measurement position P2, and a third measurement position P3. In this step, the controlling circuit 40 drives the actuator of the probe beam generating unit 20 to adjust the irradiation position of the probe beam R21. The intervals between measurement positions can be decided in accordance with the size of the inner structure 63 to be detected, test object information to be acquired, and the like. For example, when the inner structure 63 to be detected is small, or the position or shape of the inner structure 63 is to be acquired, the intervals between measurement positions are set to be small. In step S2, the controlling circuit 40 causes the probe beam generating unit 20 to start emitting the probe beam R21. The probe beam generating unit 20 starts irradiating the second surface region A21 with the probe beam R21. The probe beam R21 is reflected by the second surface region A21. The reflected beam R22 is incident on the photodetector 30. In step S3, the controlling circuit 40 causes the photodetector 30 to start measuring the reflection intensity of the probe beam R21. That is, the photodetector 30 starts measuring the intensity of the received probe beam R21. The measured value is output as a photodetection signal to the controlling circuit 40. The controlling circuit 40 temporarily records the received photodetection signal.

In step S4, the controlling circuit 40 causes the pump beam generating unit 10 to emit the pump beam R1 as a short-pulse laser beam. The pump beam generating unit 10 emits the pump beam R1 to the first surface region A11. The pump beam R1 incident from the first surface region A11 into the first region A1 is transmitted through the first inner region A12. The pump beam R1 transmitted through the first inner region A12 reaches the absorber 50. In this case, the maximum size of the absorber 50 is smaller than the beam diameter of the pump beam R1, as shown in FIG. 3. The pump beam R1 that has reached the absorber 50 is absorbed by the absorber 50. When the absorber 50 absorbs the energy of the pump beam R1, the temperature of the absorber 50 rises. As the temperature of the absorber 50 rises, the absorber 50 instantly expands. The rapid expansion of the absorber 50 generates elastic waves E1. FIG. 3 shows the wave fronts of the generated elastic waves E1. The elastic wave E1 isotropically propagates inside the test object 60, with the absorber 50 being the center. That is, the pump beam generating unit 10 generates the elastic wave E1 centered on the absorber 50 inside the test object 60. The elastic wave E1 is an elastic wave that interferes with a structure smaller than the spot diameter of a laser beam or the beam diameter.

The propagation of the elastic wave E1 inside the test object 60 will be described below. The following will exemplify a case in which the elastic waves E1 propagating in the respective directions include the elastic wave E1 propagating in a first propagation direction d1, the elastic wave E1 propagating in a second propagation direction d2, and the elastic wave E1 propagating in a third propagation direction d3, as shown in FIG. 3. Assume that the directions from the absorber 50 to the first measurement position P1, the second measurement position P2, and the third measurement position P3 are respectively the propagation direction d1, the second propagation direction d2, and the third propagation direction d3. As shown in FIG. 3, the elastic waves E1 propagating in the propagation direction d1 and the second propagation direction d2 reach the first measurement position P1 and the second measurement position P2 of the obverse object surface 61 without being interfered by the inner structure 63. That is, the elastic waves E1 propagating in the propagation direction d1 and the second propagation direction d2 can reach the second surface region A21. In contrast to this, the elastic wave E1 propagating in the third propagation direction d3 does not reach the third measurement position P3 of the obverse object surface 61 because of interference with the inner structure 63. That is, the elastic wave E1 propagating in the third propagation direction d3 cannot reach the second surface region A21.

In step S5, the controlling circuit 40 causes the probe beam generating unit 20 to finish the emission of the probe beam R21 which is started in step S2. The probe beam generating unit 20 finishes irradiating the second surface region A21 with the probe beam R21. In step S6, the controlling circuit 40 acquires the time-series data of the reflection intensity of the probe beam R21 based on the temporarily recorded photodetection signal. The controlling circuit 40 records the acquired time-series data of the reflection intensity of the probe beam R21 in the recording circuit. The time-series data of the reflection intensity acquired in this manner is recorded for each measurement position. In step S7, the controlling circuit 40 determines whether measurement in a predetermined measurement range set in advance is completed. If the controlling circuit 40 does not determine that the measurement in the measurement range is completed, the process returns to step S1. Upon determining in step S7 that the measurement in the measurement range is completed, the controlling circuit 40 repeats the processing from step S1 to step S7. If the controlling circuit 40 determines that the measurement in the measurement range is completed, the process advances to step S8.

In step S8, the controlling circuit 40 executes acquisition processing for test object information. This processing is performed based on the time-series data of the reflection intensity acquired for each measurement position. The reflection intensity of the probe beam R21 depends on the reflectance of the probe beam R21 in the second surface region A21. The reflectance of the probe beam R21 by the obverse object surface 61 depends on the difference in refractive index between the probe beam R21 before incidence on the obverse object surface 61 and the probe beam R21 after incidence on the obverse object surface 61 on the light beam path. That is, the reflectance of the probe beam R21 by the second surface region A21 depends on the magnitude of the refractive index of the second surface region A21. The refractive index of the second surface region A21 slightly changes as the elastic wave E1 distorts. In this case, the elastic wave E1 makes distortion propagate inside the test object 60. That is, when the elastic wave E1 reaches the second surface region A21, the reflection intensity of the probe beam R21, that is, the intensity of the reflected beam R22, changes. That is, the second region A2 can be expressed as a region that changes the reflectance of the probe beam R21 when the elastic wave E1 reaches the second surface region A21. Note that a change in the reflection intensity of the probe beam R21 may be detected as a change in a reflection angle ϕr of the probe beam R21.

For example, the elastic waves E1 propagating in the propagation direction d1 and the third propagation direction d3 respectively reach the first measurement position P1 and the third measurement position P3 in the second surface region A21, thereby changing the reflection intensity of the probe beam R21. That is, the time-series data of the intensities of the reflected beams R22 acquired at the first measurement position P1 and the third measurement position P3 have undergone time-series changes. On the other hand, for example, because the elastic wave E1 propagating in the second propagation direction d2 is interfered by the inner structure 63, the elastic wave E1 does not reach the second measurement position P2 of the second surface region A21, and hence does not change the reflection intensity of the probe beam R21. That is, the time-series data of the intensity of the reflected beam R22 acquired at the second measurement position P2 has undergone no time-series change.

The controlling circuit 40 determines whether the time-series data of reflection intensity at each measurement position has undergone a time-series change. That is, the controlling circuit 40 determines the presence/absence of the inner structure 63. In this case, information concerning the presence/absence of the inner structure 63 is an example of test object information. In this determination, when there is no time-series change, the controlling circuit 40 determines that the inner structure 63 exists in the second inner region A22. Note that an expression indicating occurrence of no time-series change can be expressed as detecting no significant time-series change.

The controlling circuit 40 also acquires the position or shape of the inner structure 63 in the second inner region A22 as test object information based on the time-series data of reflection intensity at each measurement position. The acquisition of test object information is further based on, for example, the position information of the absorber 50. The position information of the absorber 50 is calculated based on, for example, the timing when the pump beam R1 has been emitted, the position information for each of at least two measurement positions for which a change in time-series has been detected, and the timing when the respective change in time-series has occurred. The position information of the absorber 50 may be recorded in the recording circuit in advance. In this manner, the controlling circuit 40 acquires the position of the inner structure 63 in the second inner region A22 or three-dimensionally reconstructs the inner structure in the second inner region A22.

Note that the first surface region A11 and the second surface region A21 may be regions inside the reverse object surface 62 or inside other planes of the test object 60. In addition, the first surface region A11 and the second surface region A21 may be regions in different surfaces of the test object 60. In this case, the first inner region A12 in which the absorber 50 is arranged is preferably separated from the second surface region A21 by a predetermined distance. Accordingly, the first surface region A11 and the second surface region A21 are preferably located at different positions in the X direction and the Z direction in, for example, the state shown in FIG. 1. That is, the first surface region A11 and the second surface region A21 are preferably located at different positions in a direction perpendicular to the depth direction D.

Note that the first region A1 of the test object 60 can also be expressed as a region provided for a test on the test object 60. On the other hand, the second region A2 can also be expressed as a region that is used as a product or part of a product. A semiconductor device such as a semiconductor wafer is sometimes provided with a test region for a test. In such a case, the first region A1 is, for example, a testing member provided in a test region. The testing member may be a substance that transmits the pump beam R1. Accordingly, the testing member may be expressed as a transparent member or a transmission member. The second region A2 is a product member used as a product or part of a product. The product member is a member tested by the optical test apparatus 1. Accordingly, the product member may be expressed as a testing member. In this case, the testing member and the product member may be integrally or separately formed. For example, the testing member may be configured to be detachable with respect to the product member. In addition, the testing member and the product member may be made of the same substance or different substances. For example, the testing member is a silicon dioxide crystal. The product member is amorphous silicon. Such substances may be decided in accordance with the wavelengths of the pump beam R1 and the probe beam R21 and the like. Note that in order to make the elastic wave E1 generated from the absorber 50 arranged in the first inner region A12 properly propagate to the second surface region A21, no impedance change preferably occurs at the interface between the first inner region A12 and the second inner region A22. For this purpose, adjustments may be made by the substance or shape of each member or by inserting a gel or the like between the testing member and the product member. In addition, the second surface region A21 may be provided with a coating to improve the reflectance of the probe beam R21.

Note that the test object 60 has, for example, a flat plate shape, as shown in FIG. 1. However, this is not exhaustive. The test object 60 may have any shape that allows elastic waves generated inside to reach the obverse object surface 61. That is, the test object 60 may have any shape that allows the elastic waves E1 radially propagating inside the first inner region A12 and the second inner region A22 to reach the second surface region A21, with the absorber 50 arranged inside the first inner region A12 being a wave source. Note that when the obverse object surface 61 is not smooth, it is preferable to know, in advance, the shape of the obverse object surface 61 by, for example, performing a scan or setting in advance.

Note that wavelengths for the pump beam R1 and the probe beam R21 and a substance used for the absorber 50 are selected in accordance with the physical properties of a solid sample used as the test object 60. That is, the test object 60 is a substance that allows elastic waves generated inside to reach the obverse object surface 61 and can reflect the probe beam R21 by the obverse object surface 61. A solid sample used as the test object 60 may be a metal such as stainless steel, Au, Al, Cu, W, or Ti or a non-metal such as carbon or amorphous carbon. Metals include alloys. In addition, the test object 60 may be a semiconductor such as S1 or SiC or a resin such as acryl or polycarbonate.

Note that the light source of the pump beam generating unit 10 and the wavelength and pulse width of the pump beam R1 are not limited those described above. For example, the pump beam R1 may be selected in accordance with, for example, the physical properties of the substances used as the test object 60 and the absorber 50. For example, the light source may be a solid-state laser such as a YVO4 laser or YLF laser or a gas laser such as an excimer laser.

Note that the irradiation position of the probe beam R21 may be changed by driving the probe beam generating unit 20 as well as the lens of the second optical system. In addition, the probe beam generating unit 20 may include a plurality of light sources or a plurality of second optical systems. In this case, the number of light sources may differ from that of second optical systems. In this case, the probe beam generating unit 20 switches the light sources for emitting the probe beams R21 or the second optical systems in accordance with the relative position of the second surface region A21. The controlling circuit 40 (to be described later) may select a light source for emitting the probe beam R21 or the second optical system.

Note that the photodetection element of the photodetector 30 may be the one that uses a photoelectric effect or thermal effect. The photodetection element may be a sensor that performs measurement at one point or a line sensor or area sensor that performs measurement at multiple points.

Note that a function as the arithmetic unit and a function as the measurement controlling unit may be provided for one circuit or may be respectively provided for different circuits. In addition, the pump beam generating unit 10, the probe beam generating unit 20, and the photodetector 30 may have part or all of the functions of the controlling circuit 40. For example, the photodetector 30 may have a function as an arithmetic unit. That is, the photodetector 30 may acquire time-series data or test object information. In this case, a photodetection signal includes time-series data or test object information.

Note that a function as the controlling circuit 40 may also be implemented by, for example, executing a computer program recorded in the recording circuit or the like or by an integrated circuit formed as a dedicated circuit. Note that the optical test apparatus 1 may not include the controlling circuit 40. That is, the controlling circuit 40 or the function as the controlling circuit 40 may be provided outside the optical test apparatus 1. In this case, the optical test apparatus 1 can be expressed as an apparatus that obtains a photodetection signal able to acquire test object information or the time-series data of a reflection intensity.

Note that the sequence of the respective steps in the above measurement processing described with reference to FIG. 2 can be changed as needed. For example, irradiation with the probe beam R21 in step S2 may be performed after the start of measurement of a reflection intensity in step S3. For example, the processing in step S8 may be performed for each measurement position before step S7. In addition, the flowchart shown in FIG. 2 is an example of measurement processing, to and from which a step can be newly added or a step can be omitted. For example, in the measurement processing, the controlling circuit 40 may generate a control signal for warning or informing the user when the inner structure 63 is detected. The control signal includes display information or audio information. Assume that the technique described above is applied to a test system. In this case, control may be performed to reject the test object 60 from a test line when the inner structure 63 is detected. Such processing may be performed, for example, before step S7 or in step S8.

The optical test apparatus, the semiconductor device, and the optical test method according to this embodiment have the following effects.

The optical test apparatus 1 according to this embodiment is an optical test apparatus for testing the inner structure of the test object 60. The optical test apparatus 1 includes the pump beam generating unit 10, the probe beam generating unit 20, and the photodetector 30. The pump beam generating unit 10 irradiates the first surface region A11 of the test object 60 with the pump beam R1 having the first wavelength $\lambda 1$. That is, the pump beam generating unit 10 emits the pump beam R1 having the first wavelength $\lambda 1$ that irradiates the first surface region A11. The first wavelength $\lambda 1$ is a wavelength that makes the beam be transmitted through the first region A1 including the first surface region A11 and the first inner region A12 and absorbed by the absorber 50 arranged in the first inner region A12. The first inner region A12 is adjacent to the first surface region A11. The probe beam generating unit 20 irradiates the second surface region A21 of the test object 60 with the probe beam R21 having the second wavelength λ2. That is, the probe beam generating unit 20 emits the probe beam R21 having the second wavelength λ2 that irradiates the second surface region A21. The second wavelength λ2 is a wavelength that makes the beam be reflected by the second surface region A21. The second surface region A21 is a region outside the first surface region A11. The photodetector 30 receives the probe beam R21 reflected by the second surface region A21. That is, the photodetector 30 receives the reflected beam R22.

The optical test method according to this embodiment is an optical test method of testing the inner structure of the test object 60. The optical test method includes starting to measure the intensity of the reflected beam R22 upon irradiating the second surface region A21 with the probe beam R21 having the second wavelength 22, and irradiating the first region A1 with the pump beam R1 having the first wavelength λ1 during irradiation with the probe beam R21 and the measurement of the intensity of the reflected beam R22. The first wavelength λ1 is a wavelength that makes the beam be transmitted through the first surface region A11 and the first inner region A12 adjacent to the first surface region A11 and absorbed by the absorber 50 arranged in the first inner region A12. The second wavelength λ2 is a wavelength that makes the beam be reflected by the second surface region A21. The second surface region A21 is a region outside the first surface region A11 irradiated with the pump beam R1 having the first wavelength λ1. The intensity of the reflected beam R22 is the reflection intensity of the probe beam R21 reflected by the second surface region A21.

The test object 60 according to this embodiment is a semiconductor device. The semiconductor device includes the first region A1, the absorber 50, and the second region A2. The first region A1 includes the first surface region A11 irradiated with the pump beam R1 and the first inner region A12 adjacent to the first surface region A11. The first region A1 transmits the pump beam R1. The absorber 50 is arranged in the first inner region A12. The absorber 50 absorbs the pump beam R1. The second region A2 includes the second surface region A21 and the second inner region A22. The second surface region A21 is a region outside the first surface region A11. The second inner region A22 is a region adjacent to the first inner region A12 and the second surface region A21. The second region A2 changes the reflectance of the probe beam R21 externally applied to the second surface region A21 when the elastic waves E1 radially propagating from the absorber 50 as a wave source reach the second surface region A21.

According to such arrangement and method, the inner structure of the test object 60 is tested by using the elastic waves E1 generated from the absorber 50 arranged in the test object 60. The elastic wave E1 is, for example, a spherical wave. That is, this technique has the effect of being able to freely set a region that can test an inner structure as compared with a case in which an object surface absorbs light and generates an elastic wave. The first region A1 is provided in, for example, a test region on semiconductor wafer as a test target. That is, the irradiation plane of the pump beam R1 is not limited to the surface of a product member. Accordingly, this technique has the effect of reducing damage to a product as compared with the case in which the surface of a product member is made to absorb light and generate an elastic wave. In addition, the time-series data of the reflection intensity of the probe beam R21 is acquired for each measurement position in the second surface region A21. The time-series data includes information indicating the presence/absence of a time-series change in reflection intensity. That is, this technique has the effect of being able to acquire information indicating the presence/absence of the inner structure 63 in the test object 60 depending on the presence/absence of a time-series change.

In the semiconductor device according to this embodiment, the first region A1 is a testing member provided in a test region of the semiconductor device, and the second region A2 is a product member of the semiconductor device. The testing member is a member different from the product member. Even this arrangement can obtain the effect of improving the material selectivity of the testing member in addition to the above effects. In addition, the second surface region A21 may be provided with a coating to improve the reflectance of the probe beam R21. This arrangement has the effect of further increasing a signal intensity in the photodetector 30 in addition to the above effects.

In the optical test apparatus 1 and the optical test method according to this embodiment, the minimum beam diameter of the pump beam R1 is larger than the absorber 50. In the semiconductor device according to the embodiment, the absorber 50 is smaller than the minimum beam diameter of the pump beam R1. According to such arrangement and method, an elastic wave generated from the absorber 50 can interfere with the inner structure 63 smaller than the spot diameter or beam diameter of a laser beam. That is, this technique can detect the inner structure 63 smaller than the spot diameter or beam diameter of a laser beam. Using the technique in this manner can have the effect of being able to improve the spatial resolution of an internal test in addition to the above effects.

In the optical test apparatus 1, the semiconductor device, and the optical test method according to this embodiment, the first wavelength λ1 differs from the second wavelength λ2. In addition, in the optical test apparatus 1, the semiconductor device, and the optical test method according to the embodiment, the first wavelength λ1 is longer than the second wavelength λ2. When the test object 60 is a semiconductor, a light beam having a long wavelength is difficult to be absorbed as compared with a light beam having a short wavelength. The pump beam R1 must be transmitted through the first region A1. As described above, according to such arrangement and method, letting the pump beam R1 have a long wavelength can have the effect of allowing the absorber 50 to more effectively absorb the energy of the pump beam R1 in addition to the above effects. Increasing the energy of the pump beam R1 absorbed by the absorber 50 can generate the elastic wave E1 having a steeper and larger amplitude. This can increase a time-series change detected. That is, the signal intensity in the photodetector 30 increases. In addition, letting the probe beam R21 have a short wavelength has the effect of allowing the second surface region A21 to more efficiently reflect the probe beam R21. In addition, it is possible to further reduce a first incident angle θ1 required for Fresnel reflection. At this time, the spot diameter on the obverse object surface 61 of the test object 60 approaches the beam diameter and decreases. This has the effect of improving the resolution of an internal test. In addition, efficiently reflecting the probe beam R21 has the effect of being able to improve the detection accuracy of the reflected beam R22 by the photodetector 30.

In the optical test apparatus 1 according to this embodiment, the wavelength of a light beam emitted from the light source of the pump beam generating unit 10 may be equal to that of a light beam emitted from the light source of the probe beam generating unit 20. In this case, the light source of the pump beam generating unit 10 may be the same as that of the probe beam generating unit 20. In addition, the pump beam generating unit 10 and the probe beam generating unit 20 may share a light source. In this case, the probe beam generating unit 20 includes, for example, a harmonic generating element to make the second wavelength λ2 of the probe beam R21 be shorter than the first wavelength λ1 of the pump beam R1. Using a second harmonic generating element (SHG) as the harmonic generating element will double the frequency of a light beam generated from the light source. That is, the wavelength of a light beam generated from the light source is halved. In addition, the pump beam generating unit 10 may include a shutter to shorten the irradiation time of the pump beam R1. In this case, in the optical test apparatus 1 according to this embodiment, the probe beam generating unit 20 includes a harmonic generating element, and the pump beam generating unit 10 and the probe beam generating unit 20 may share a light source. According to this arrangement, even when the light source emits light beams having the same wavelength, the first wavelength λ1 can be longer than the second wavelength λ2. This makes it possible to obtain the above effects.

In the optical test apparatus 1 and the optical test method according to this embodiment, the pump beam generating unit 10 is configured to emit a short-pulse laser beam as the pump beam R1. That is, the light source of the pump beam generating unit 10 is a short-pulse laser. In addition, in the semiconductor device according to the embodiment, the pump beam R1 absorbed by the absorber 50 is a short-pulse laser beam. Such arrangement and method have the effect of allowing the absorber 50 to generate the steep elastic wave E1 in addition to the above effects. The steep elastic wave E1 contributes to an improvement in detection accuracy.

The optical test apparatus 1 according to this embodiment further includes the controlling circuit 40 that acquires information concerning the presence/absence of the inner structure 63 of the test object 60 based on the presence/absence of a time-series change in the reflection intensity of the probe beam R21. In addition, the optical test method according to the embodiment further includes acquiring information concerning the presence/absence of the inner structure 63 of the test object 60 based on the presence/absence of a time-series change in the reflection intensity of the probe beam R21. Such arrangement and method have the effect of being able to acquire information indicating the presence/absence of the inner structure 63 of the test object 60 based on the time-series data of the reflection intensity acquired for each measurement position. For example, when there is no time-series change in reflection intensity, it is determined that the inner structure 63 is present.

The optical test apparatus 1 according to this embodiment further includes the controlling circuit 40 that acquires information concerning the presence/absence, position, or shape of the inner structure 63 of the test object 60 based on the position information of irradiation regions of the plurality of probe beams R21 in the second surface region A21 and the presence/absence of a time-series change in the reflection intensity of the probe beam R21 for each position information. The optical test method according to the embodiment further includes acquiring information concerning the presence/absence, position, or shape of the inner structure 63 of the test object 60 based on the position information of irradiation regions of the plurality of probe beams R21 in the second surface region A21 and the presence/absence of a time-series change in the reflection intensity of the probe beam R21 for each position information. Such arrangement and method have the effect of being able to acquire information concerning the presence/absence, position, or shape of the inner structure 63 of the test object 60 based on the acquired time-series data of reflection intensity for each measurement position in the second surface region A21 in addition to the above effects. Assume that the inner structure 63 to be detected is small. In this case, when the position or shape of the inner structure 63 is to be acquired, the intervals between measurement positions are preferably set to be small. That is, this technique has the effect of being able to acquire more detailed test object information with an increase in the number of measurement positions.

In the optical test apparatus 1, the semiconductor device, and the optical test method according to this embodiment, the first surface region A11 and the second surface region A21 are located at different positions in a direction perpendicular to the depth direction D of the test object 60. In this case, the test object 60 is, for example, a semiconductor device. Such arrangement and method have the effect of being able to increase the spatial resolution of an internal test in addition to the above effects. For example, as the absorber 50 is separated from the second surface region A21 in a direction perpendicular to the depth direction D of the test object 60, the intervals between light beam directions from the absorber 50 toward the respective positions in the second surface region A21 increase. That is, as the absorber 50 is separated from the second surface region A21 in a direction perpendicular to the depth direction D of the test object 60, the intervals between light beam directions decrease relative to the intervals between fixed measurement positions, thereby improving the angular resolution.

Modification of First Embodiment

As described above, the pump beam R1 is required to be transmitted through the first region A1 of the test object 60 and absorbed by the absorber 50 arranged in the test object 60. The probe beam R21 is required to be reflected by the second surface region A21 of the test object 60. The first embodiment has exemplified the case in which these requirements are satisfied by selection of the first wavelength λ1 of the pump beam R1 and the second wavelength λ2 of the probe beam R21. On the other hand, these requirements may be satisfied by controlling the incident angles of the pump beam R1 and the probe beam R21. The first incident angle 81 of the pump beam R1 and the second incident angle ϕ1 of a probe beam will be described with reference to FIG. 1.

The pump beam R1 is applied to the first surface region A11 of the test object 60 so as to be absorbed by the absorber 50 arranged in the test object 60. That is, the pump beam R1 is preferably not reflected by the first surface region A11. For this reason, the first incident angle θ1 of the pump beam R1 with respect to the first surface region A11 is preferably small. The first incident angle θ1 is smaller than, for example, the second incident angle ϕ1. The first incident angle θ1 is, for example, less than 70°. The probe beam R21 is applied to the second surface region A21 so as to be reflected by the second surface region A21 of the test object 60. Accordingly, the second incident angle ϕ1 is preferably set to increase Fresnel reflection by the second surface region A21 of the test object 60. The second incident angle ϕ1 is, for example, 70°.

As described above, in the optical test apparatus 1, the semiconductor device, and the optical test method according to this embodiment, the second incident angle ϕ1 of the probe beam R21 with respect to the second surface region A21 is larger than the first incident angle θ1 of the pump beam R1 with respect to the first surface region A11. Even such arrangement and method can obtained the same effect as that in the above embodiment. That is, the signal intensity in the photodetector 30 increases. In addition to this effect, the selection of wavelengths of light beams used as the pump beam R1 and the probe beam R21 can be facilitated.

Note that a technique according to this modification can be combined with the technique according to the above embodiment. That is, after wavelengths are selected for the pump beam R1 and the probe beam R21, the incident angles of the pump beam R1 and the probe beam R21 may be set. In this case as well, it is possible to obtain the same effects as those of the first embodiment and the modification of the first embodiment.

Second Embodiment

An optical test apparatus 1 according to this embodiment will be described in detail below with reference to the accompanying drawings. Differences from the first embodiment will be mainly described below. The same reference signs denote the same parts, and a description of them will be omitted.

Figure 4:
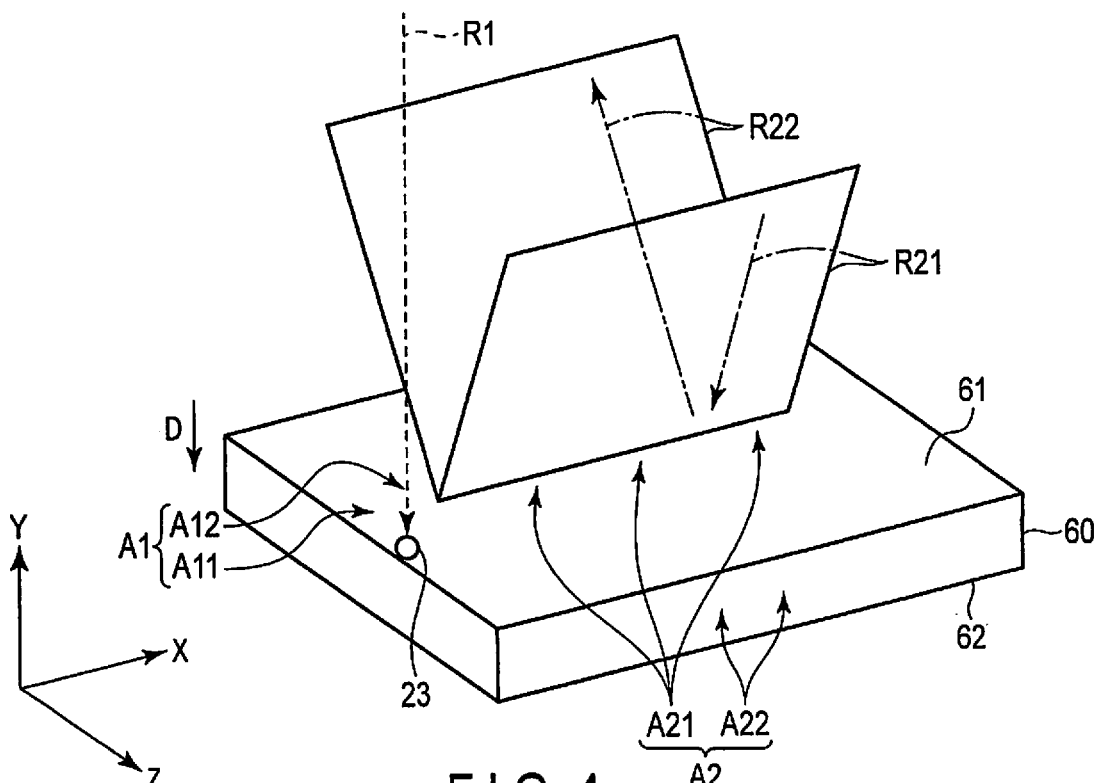
FIG. 4 is a view for explaining an example of an optical test apparatus according to the second embodiment.

The arrangement of the optical test apparatus 1 according to this embodiment will be described first in detail below with reference to the accompanying drawings. FIG. 4 is a view for explaining an example of the optical test apparatus 1 according to the embodiment. FIG. 4 shows an example of a test object 60 according to the embodiment and an example of the light beam path of light used in the optical test apparatus 1 according to the embodiment.

The light source of a probe beam generating unit 20 according to this embodiment is a line laser. A probe beam R21 according to the embodiment is a line laser beam. In this case, a line laser beam is a laser beam having a linear (band-shaped) beam profile with a finite width. The beam profile is the sectional intensity distribution of a laser beam. Note that a line laser beam may be expressed as a sheet beam. As shown in FIG. 4, the probe beam generating unit 20 according to the embodiment emits a line laser beam as the probe beam R21.

A photodetection element of a photodetector 30 according to this embodiment is a line sensor. The line sensor is an optical sensor having a linear photodetection surface. Note that an area sensor or a plurality of optical sensors arranged in a linear pattern may be used in place of the line sensor. The line sensor is arranged to receive almost the entire linear probe beam R21 reflected by a second surface region A21. A photodetection signal further includes position information on the photodetection surface of the line sensor.

The operation of the optical test apparatus 1 according to this embodiment will be described in detail next with reference to FIGS. 2 and 4.

For example, in the state of FIG. 4, a controlling circuit 40 executes processing in step S1 to step S7 with respect to a plurality of measurement positions in the Z direction when the width of the irradiation range of the probe beam R21 in the X direction is larger than the width of a predetermined measurement range in the X direction. Note that the contents of processing in step S1 to step S8 are the same as those of each processing according to the first embodiment.

The probe beam R21 is applied to the second surface region A21 of the test object 60. In this case, the irradiation plane of the probe beam R21 in the second surface region A21 becomes linear. The line laser beam applied to the obverse object surface 61 of the test object 60 is regularly reflected by an obverse object surface 61. That is, as shown in FIG. 4, the beam profile of a reflected beam R22 has also a linear shape having a finite width. The probe beam R21 reflected in a linear shape is incident on the line sensor of the photodetector 30.

As described above, the optical test apparatus 1 according to this embodiment simultaneously acquires the time-series data of reflection intensities at the respective positions in the irradiation plane.

The optical test apparatus 1, the semiconductor device, and the optical test method according to this embodiment have the following effects.

In the optical test apparatus 1 according to this embodiment, the probe beam generating unit 20 is configured to emit a line laser beam as the probe beam R21. In addition, in the optical test apparatus, the semiconductor device, and the optical test method according to the embodiment, the irradiation plane of the probe beam R21 in the second surface region A21 is a linear region. Such arrangement and method have the effect of being able to simultaneously acquire the reflection intensities of the probe beams R21 at the respective positions on the irradiation plane. That is, this technique can simultaneously perform measurement at multiple points. This modification has the effect of measuring a time-series change in reflection intensity at high speed in addition to the effects obtained by the technique according to the first embodiment. That is, this technique has the effect of being able to acquire test object information at high speed.

Although this embodiment has exemplified the case in which the probe beam R21 having a linear beam profile is used, this is not exhaustive. The beam profile of the probe beam R21 may have a rectangular, crisscross, or plural-line shape. In addition, the beam profile of each of these probe beams R21 may be implemented by a plurality of dots. In this case, the shape of the photodetection surface of the photodetector 30 may be properly selected in accordance with the beam profile of the probe beam R21. That is, in the optical test apparatus 1 according to this embodiment, the probe beam generating unit 20 may be configured to emit a plurality of probe beams R21. The probe beam generating unit 20 may include a plurality of light sources or a plurality of second optical systems. In this case, the number of light sources may differ from that of second optical systems.

Third Embodiment

An optical test apparatus 1 according to this embodiment will be described in detail below with reference to the accompanying drawings. Differences from the second embodiment will be mainly described below. The same reference signs denote the same parts, and a description of them will be omitted.

Figure 5:
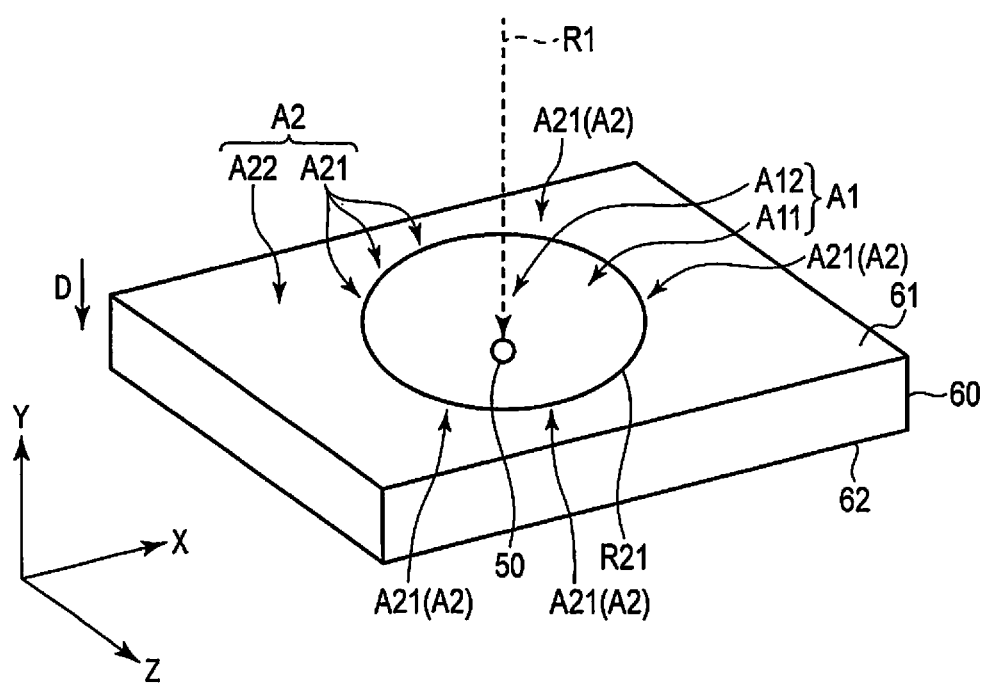
FIG. 5 is a view for explaining an example of an optical test apparatus according to the third embodiment.

The arrangement of the optical test apparatus 1 according to this embodiment will be described first in detail below with reference to the accompanying drawings. FIG. 5 is a view for explaining an example of the optical test apparatus 1 according to the embodiment. FIG. 5 shows an example of a test object 60 according to the embodiment and an example of the light beam path of light used in the optical test apparatus 1 according to the embodiment.

A probe beam R21 emitted from a probe beam generating unit 20 according to this embodiment has an annular beam profile. As shown in FIG. 5, the probe beam generating unit 20 according to the embodiment emits the probe beam R21 having the annular beam profile.

A photodetection element of a photodetector 30 according to this embodiment is, for example, an area sensor. The photodetection plane of the photodetection element is arranged to receive almost all of the probe beams R21 reflected by a second surface region A21.

In the test object 60 according to this embodiment, the irradiation region of the probe beam R21 in the second surface region A21 is annular. A first surface region A11 is a region located inside the second surface region A21 in an X-Z plane shown in, for example, FIG. 5. The absorber 50 is arranged on the central axis of the annular irradiation region of the probe beam R21 in the second surface region A21.

The operation of the optical test apparatus 1 according to this embodiment will be described in detail next with reference to FIGS. 2 and 5.

The contents of processing in step S1 to step S8 are the same as those of each processing according to the second embodiment. Not that in step S1, a controlling circuit 40 decides a measurement range and a measurement position in the second surface region A21 so as to locate an absorber 50 on the central axis. In addition, when, for example, a plurality of measurement ranges are set, the plurality of measurement ranges are set in a concentric pattern.

The probe beam generating unit 20 irradiates the second surface region A21 with the probe beam R21 having an annular beam profile. The irradiation region of the probe beam R21 is an annular region in the second surface region A21. The annular probe beam R21 applied to the second surface region A21 is regularly reflected by an obverse object surface 61. The reflected annular probe beam R21 is incident on the area sensor of the photodetector 30.

In this manner, the optical test apparatus 1 according to this embodiment simultaneously acquires the time-series data of reflection intensities at the respective positions in the irradiation plane. In this case, when no inner structure 63 is present between the absorber 50 and the second surface region A21, the elastic waves E1 propagating in the respective directions simultaneously reach the second surface region A21. At this time, the reflection intensities at the respective positions in the irradiation plane, that is, the irradiation region, simultaneously change. On the other hand, when the inner structure 63 is present between the absorber 50 and the second surface region A21, the elastic waves E1 are generated such that some of them do not reach the second surface region A21, while the other reach different positions in the second surface region A21 at different timings. In this case, the reflection intensities at the respective positions in the irradiation plane do not simultaneously change. The controlling circuit 40 acquires information indicating the presence/absence of the inner structure 63 as test object information based on the time-series data of reflection intensities at the respective positions in the irradiation plane. Upon detecting portions where the reflection intensities change at different timings or by different amounts, the controlling circuit 40 determines that the inner structure 63 is present in the second inner region A22. That is, the controlling circuit 40 detects the presence/absence of the inner structure 63 in the second inner region A22 based on a time-series change in reflection intensity.

Note that more detailed test object information is acquired based on the time-series data acquired in a plurality of measurement ranges set in a concentric pattern as in the first embodiment and the second embodiment. A photodetection signal further includes position information on the photodetection plane. That is, the position or shape of the inner structure 63 can be acquired as test object information.

Note that the beam profile of the probe beam R21 according to this embodiment can be expressed as including at least two points located at point-symmetrical positions with respect to the optical axis or center of the probe beam R21. Such points will be referred to as symmetrical points hereinafter. The beam profile of the probe beam R21 is not limited to an annular shape like that shown in FIG. 5 and may be an arcuated shape. Note that the annular shape is not limited to a true circle. For example, in order to bring the shape of an irradiation region in the second surface region A21 close to a true circle, the probe beam generating unit 20 may emit the probe beam R21 having an elliptic annular shape as a beam profile. In addition, the probe beam generating unit 20 may emit the probe beam R21 having an annular shape close to a true circle as a beam profile so as to form an elliptic irradiation region. Alternatively, the probe beam R21 may have a rectangular, crisscross, or plural-line shape. In addition, the beam profile of each of these probe beams R21 may be implemented by a plurality of dots. In this case, the shape of the photodetection surface of the photodetector 30 may be properly selected in accordance with the beam profile of the probe beam R21. A photodetection signal further includes the position information of at least one set of symmetrical points on the photodetection plane. In this case, the time-series data of reflection intensities at the corresponding symmetrical points are simultaneously acquired. The controlling circuit 40 acquires information indicating the presence/absence of the inner structure 63 in the second inner region A22 as test object information based on time-series changes in reflection intensity at the corresponding symmetrical points.

The optical test apparatus 1, the semiconductor device, and the optical test method according to this embodiment have the following effects.

In the optical test apparatus 1 according to this embodiment, the probe beam generating unit 20 is configured to emit the probe beam R21 having an annular beam profile, and the central axis of the irradiation region of the probe beam R21 in the second surface region A21 passes through the absorber 50. In addition, in the optical test apparatus 1, the semiconductor device, and the optical test method according to the embodiment, the second surface region A21 is an annular region, and the absorber 50 is arranged on the central axis of the annular shape. Such arrangement and method have the effect of being able to detect the presence/absence of the inner structure 63 based on the time-series data of reflection intensities simultaneously acquired at the respective positions in the irradiation plane. That is, this technique has the effect of being able to reduce the number of times of measurement associated with the detection of presence/absence in addition to the effects obtained by the techniques according to the first embodiment and the second embodiment. In this case, a region where the presence/absence of the inner structure 63 is detected is a region in the second inner region A22.

Note that the techniques according to the respective embodiments and the modification can be combined as appropriate. For example, the technique according to the modification of the first embodiment can be combined with the techniques according to the second embodiment and the third embodiment.

The techniques according to the respective embodiments and the modification can perform a non-destructive internal inspection of a test object.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical test apparatus comprising:
a first laser configured to irradiate a first surface region of a test object with a pump beam having a first wavelength which is transmitted through a first region including the first surface region and a first inner region adjacent to the first surface region and absorbed by an absorber arranged in the first inner region, wherein a minimum beam diameter of the pump beam is larger than the absorber;
a second laser configured to irradiate a second surface region outside the first surface region with a probe beam having a second wavelength which is reflected by the second surface region; and
a photodetector configured to receive the probe beam reflected by the second surface region.

2. The apparatus of claim 1, wherein the first wavelength differs from the second wavelength.

3. The apparatus of claim 1, wherein the first wavelength is longer than the second wavelength.

4. The apparatus of claim 1, wherein an incident angle of the probe beam with respect to the second surface region is larger than an incident angle of the pump beam with respect to the first surface region.

5. The apparatus of claim 1, wherein the first laser is configured to emit a pulse laser having a pulse width equal to or smaller than a millisecond order as the pump beam.

6. The apparatus of claim 1, wherein the second laser is configured to emit a plurality of probe beams.

7. The apparatus of claim 1, wherein the second laser is configured to emit a line laser beam as the probe beam.

8. The apparatus of claim 1, wherein the second laser is configured to emit the probe beam having an annular beam profile, and
a central axis of an irradiation region of the probe beam in the second surface region passes through the absorber.

9. The apparatus of claim 1, wherein the second laser includes a harmonic generating element, and
a light source of the first laser is shared by the second laser.

10. The apparatus of claim 1, further comprising a controlling circuit configured to acquire information concerning presence/absence of an inner structure of the test object based on presence/absence of a time series change in reflection intensity of the probe beam.

11. The apparatus of claim 1, further comprising a controlling circuit configured to acquire information concerning presence/absence, a position, or a shape of an inner structure of the test object based on position information of irradiation regions of the plurality of probe beams in the second surface region and presence/absence of a time series change in reflection intensity of the probe beam for the each position information.

12. An optical test method comprising:
irradiating a second surface region of a test object with a probe beam having a second wavelength which is reflected by the second surface region outside a first surface region of the test object which is irradiated with a pump beam having a first wavelength;
starting to measure a reflection intensity of the probe beam reflected by the second surface region; and
irradiating the first surface region with the pump beam having the first wavelength which is transmitted through a first region including the first surface region and a first inner region adjacent to the first surface region and absorbed by an absorber arranged in the first inner region during irradiation with the probe beam and measurement, wherein a minimum beam diameter of the pump beam is larger than the absorber.

13. The method of claim 12, further comprising acquiring information concerning presence/absence of an inner structure of the test object based on presence/absence of a time series change in the reflection intensity.

14. The method of claim 12, further comprising acquiring information concerning presence/absence, a position, or a shape of an inner structure of the test object based on position information of irradiation regions of the plurality of probe beams in the second surface region and presence/absence of a time series change in the reflection intensity for the each position information.

* * * * *